US010832257B2

(12) United States Patent
Lutich et al.

(10) Patent No.: US 10,832,257 B2
(45) Date of Patent: Nov. 10, 2020

(54) INFORMATION SECURITY SYSTEM FOR FRAUD DETECTION

(71) Applicant: Sachcontrol GmbH, Dresden (DE)

(72) Inventors: Andrey Lutich, Dresden (DE); Lars Rietzschel, Bannewitz (DE)

(73) Assignee: Sachcontrol GMBH, Dresden (DE)

( * ) Notice: Subject to any disclaimer, the term of this patent is extended or adjusted under 35 U.S.C. 154(b) by 313 days.

(21) Appl. No.: 16/024,196

(22) Filed: Jun. 29, 2018

(65) Prior Publication Data
US 2020/0005333 A1    Jan. 2, 2020

(51) Int. Cl.
| G06Q 40/00 | (2012.01) |
| G06Q 99/00 | (2006.01) |
| G06Q 30/00 | (2012.01) |
| G06N 3/08  | (2006.01) |
| H04W 12/12 | (2009.01) |

(52) U.S. Cl.
CPC .......... *G06Q 30/0185* (2013.01); *G06N 3/08* (2013.01); *H04W 12/12* (2013.01)

(58) Field of Classification Search
None
See application file for complete search history.

(56) References Cited

U.S. PATENT DOCUMENTS

| 7,840,455 B1 | 11/2010 | Venkatasubramanian et al. |
| 10,043,073 B2 * | 8/2018 | Ross ..................... H04L 9/3247 |
| 2008/0249820 A1 | 10/2008 | Pathria et al. |
| 2011/0246262 A1 | 10/2011 | Pepper et al. |
| 2011/0295623 A1 * | 12/2011 | Behringer .............. G06Q 10/10 705/4 |
| 2016/0358268 A1 | 12/2016 | Verma et al. |
| 2020/0110930 A1 * | 4/2020 | Simantov ............... G06N 20/00 |

OTHER PUBLICATIONS

Patent Cooperation Treaty, International Search Report and Written Opinion, International Application No. PCT/IB2019/000807, dated Dec. 2, 2019, 12 pages.

\* cited by examiner

*Primary Examiner* — Ariel J Yu

(74) *Attorney, Agent, or Firm* — Baker Botts L.L.P.

(57) ABSTRACT

In one embodiment, a method includes receiving an invoice. The invoice includes invoice positions and each of the invoice positions includes a position text. The method also includes converting each word and number of the position text of each invoice position to a word embedding vector, summing the word embedding vectors for each invoice position to generate a word vector for each invoice position, and concatenating the word vector and a number vector of each invoice position to generate a position vector for each invoice position. The method further includes generating a first combined position vector for a first invoice position, generating a second combined position vector for a second invoice position, generating an invoice vector by summing the first and second combined position vectors, comparing the invoice vector to a fraud detection parameter, and determining whether the invoice is indicative of fraud based on the comparison.

20 Claims, 5 Drawing Sheets

INFORMATION SECURITY SYSTEM FOR FRAUD DETECTION

TECHNICAL FIELD

This disclosure generally relates to an information security system, and more specifically to an information security system for fraud detection.

BACKGROUND

Many enterprises have expansive networks that receive large quantities of data. One of the technical challenges that occurs in a network environment is ensuring integrity of the data received by the network environment. As an example, an enterprise may receive thousands of invoices. Without the ability to efficiently detect error in large quantities of data, the enterprise is vulnerable to allowing fraudulent data (e.g. fraudulent invoices) to escape detection.

SUMMARY OF PARTICULAR EMBODIMENTS

According to an embodiment, a network security system for fraud detection includes one or more processors and a memory communicatively coupled to the one or more processors. The memory includes instructions executable by the one or more processors. The processors are operable when executing the instructions to receive an invoice. The invoice includes invoice positions, each of the invoice positions including a position text. The processors are also operable to convert each word and number of the position text of each invoice position to a word embedding vector, sum the word embedding vectors for each invoice position to generate a word vector for each invoice position, and concatenate the word vector and a number vector of each invoice position to generate a position vector for each invoice position. The processors are further operable to generate a first combined position vector for a first invoice position by modifying the position vectors that neighbor a first position vector, condensing the neighboring position vectors of the first position vector to generate a first condensed position vector, and concatenating the first condensed position vector and the first position vector to generate the first combined position vector. Similarly, the processors are operable to generate a second combined position vector for a second invoice position by modifying the position vectors that neighbor a second position vector, condensing the neighboring position vectors of the second position vector to generate a second condensed position vector, and concatenating the second condensed position vector and the second position vector to generate the second combined position vector. The processors are further operable to generate an invoice vector by summing the first combined position vector and the second combined position vector, compare the invoice vector to a fraud detection parameter; and determine whether the invoice is indicative of fraud based on the comparison.

Technical advantages of certain embodiments may include providing a system and/or method of detecting fraud in large quantities of invoices by transforming the invoice to a vector representative of the entire invoice and comparing the invoice vector to sample invoice vectors that are determined to be free from fraud. Another technical advantage of certain embodiments may include providing a system and/or method for deriving information missing from a position text within an invoice by using the neighboring position texts. For example, a deep neural network may be trained to transform incomplete position text to complete position text by utilizing several (e.g., hundreds or thousands) common position texts. Other technical advantages will be readily apparent to one skilled in the art from the following figures, descriptions, and claims. Moreover, while specific advantages have been enumerated above, various embodiments may include all, some, or none of the enumerated advantages.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

To assist in understanding the present disclosure, reference is now made to the following description taken in conjunction with the accompanying drawings, in which.

DETAILED DESCRIPTION OF EXAMPLE EMBODIMENTS

One of the technical challenges that occurs in computer technology, such as a network environment, is ensuring data integrity when large quantities of data are received by the network environment. As an example, an enterprise (e.g., an insurance company) may receive thousands of invoices (e.g., car repair invoices and/or property damage invoices) and may be required to take action based on these invoices (e.g., distributing payment for damaged property). Conventional systems are typically unable to efficiently detect malicious activity (e.g., fraud) in the invoices. Without the ability to efficiently and quickly detect malicious activity in the invoices, the enterprise is vulnerable to fraudulent attacks.

The system described in the present application provides a technical solution to detect and prevent malicious activity and/or inaccuracies in information received by an enterprise. The ability to detect and prevent malicious activity improves the operation of the system and the security of the enterprise. For example, the system is able to identify malicious activity in a repair invoice before the system decides whether to approve the invoice. As another example, the system is able to identify errors in a repair invoice, which provides an opportunity for corrective action prior to processing the invoice for payment. Thus, the system provides an unconventional technical solution that allows the system to protect itself from malicious activity and errors that may hinder an enterprise's success.

Figure 1:
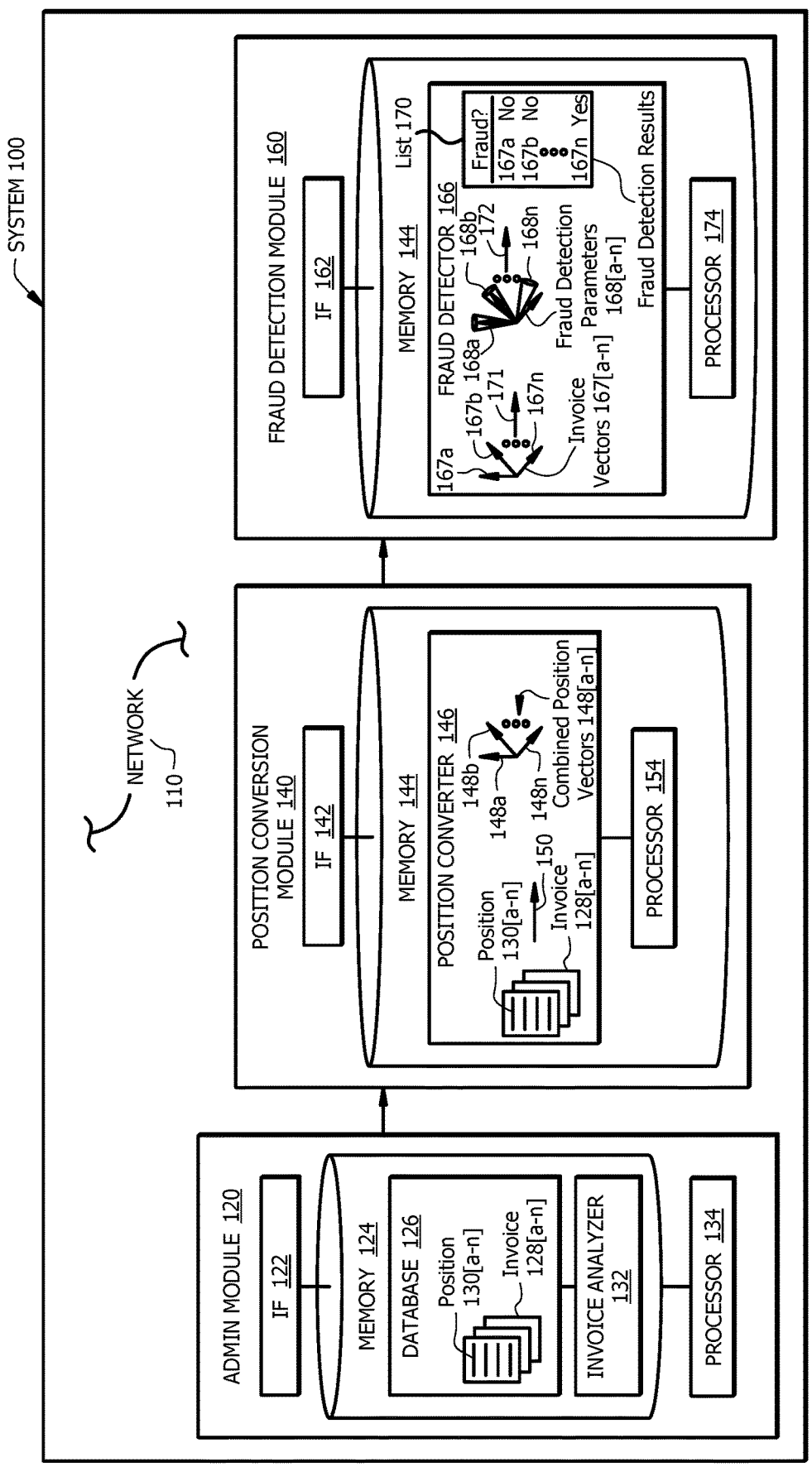
FIG. 1 illustrates an example system configured to implement fraud detection, according to certain embodiments.

FIG. 1 illustrates an example system 100 configured to implement fraud detection, according to certain embodiments. System 100 includes an administrative module 120, a position conversion module 140, and a fraud detection module 160 connected to each other by a network 110. In general, system 100 facilitates implementing fraud detection through analysis by administrative module 120, position conversion module 140, and fraud detection module 160 of information stored in one or more databases.

System 100 or portions thereof may be associated with an entity, which may include any entity, such as a person, business, or company, that analyzes data for fraud detection. Throughout this description, this entity is referred to as the entity associated with system 100. In one embodiment, administrative module 120, position conversion module 140, and fraud detection module 160 may be included within an entity and connected by network 110. The elements of system 100 may be implemented using any suitable combination of hardware, firmware, and software.

Although FIG. 1 illustrates a particular arrangement of administrative module 120, position conversion module 140, fraud detection module 160, and network 110, this disclosure contemplates any suitable arrangement of administrative module 120, position conversion module 140, fraud detection module 160, and network 110. As an example and not by way of limitation, two or more of administrative module 120, position conversion module 140, and fraud detection module 160 may be connected to each other directly, bypassing network 110. As another example, two or more of administrative module 120, position conversion module 140, and fraud detection module 160 may be physically or logically co-located with each other in whole or in part. Moreover, although FIG. 1 illustrates a particular number of administrative modules 120, position conversion modules 140, fraud detection modules 160, and networks 110, this disclosure contemplates any suitable number of administrative modules 120, position conversion modules 140, fraud detection modules 160, and networks 110. As an example and not by way of limitation, network environment 100 may include multiple administrative modules 120, position conversion modules 140, and fraud detection modules 160.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

In some embodiments, administrative module 120 is a computer program for analyzing data to identify characteristics of the data (e.g., one or more positions of an invoice). In the illustrated embodiment, administrative module 120 includes an interface 122, a memory 124, and a processor 134. Memory 124 of administrative module includes database 126 and invoice analyzer 132. The elements of administrative module 120 may be implemented using any suitable combination of hardware, firmware, and software.

Administrative module 120 may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more servers, a server pool, switch, router, one or more processors within these or other devices, or any other suitable processing device. Administrative module 120 may be a stand-alone computer or may be a part of a larger network of computers associated with an entity.

Interface 122 of administrative module 120 represents any suitable computer element that can receive information from network 110, transmit information through network 110, perform suitable processing of the information, communicate to other components (e.g., position conversion module 140) of system 100, or any combination of the preceding. For example, interface 122 may receive a communication from a workstation, transmit information pertaining to the received communication to position conversion module 140, receive responses from fraud detection module 160, and/or communicate a response to the workstation. Interface 122 represents any port or connection, real or virtual, including any suitable combination of hardware, firmware, and software, including protocol conversion and data processing capabilities, to communicate through a Local Area Network ("LAN"), Wide Area Network ("WAN"), or other communication system that allows the entity associated with system 100 to exchange information between components of system 100.

Memory 124 of administrative module 120 stores, permanently and/or temporarily, received and transmitted information, as well as system software, control software, other software for administrative module 120, and a variety of other information. Memory 124 may store information for execution by processor 134. In the illustrated embodiment, memory 124 stores database 126 and invoice analyzer 132 of administrative module 120.

Memory 124 includes any one or a combination of volatile or non-volatile local or remote devices suitable for storing information. For example, memory 124 may include Random Access Memory ("RAM"), Read-only Memory ("ROM"), magnetic storage devices, optical storage devices, or any other suitable information storage device or a combination of these devices. Memory 124 may include any suitable information for use in the operation of administrative module 120. Additionally, memory 124 may be a component external to (or may be partially external to) administrative module 120. Memory 124 may be located at any location suitable for memory 124 to communicate with administrative module 120.

Database 126 of administrative module 120 may be any database that stores data. Database 126 may store certain types of information for the entity associated with system 100. For example, database 126 may store one or more invoices 128a-n, where n is any suitable integer. In certain embodiments, database 126 stores characteristics associated with invoices 128a-n. For example, database 126 may store one or more positions 130a-n associated with each invoice 128. Each position 130a-n is a line item of an invoice describing a service or product added to the invoice. For example, invoice 128a may include five invoice positions 130a-e, wherein: position 130a includes position text describing a service (e.g., "move desks"), an associated unit (e.g., "flat" rate), an associated quantity (e.g., "1" flat rate), and an associated price per unit (e.g., "$50" per flat rate); position 130b includes position text describing a product (e.g., "white paint"), an associated unit (e.g., "gallon"), an associated quantity (e.g., "10" gallons), and an associated price per unit (e.g., "$15" per gallon); and so on. In certain embodiments, database 126 stores certain types of information received from one or more components of system 100. For example, database 126 may store results generated by fraud detection module 160. Database 126 may be one database in a collection of databases 126a-n. In some embodiments, each database 126a-n may store a particular type of information. For example, database 126a may store invoices 128a-n and database 126b may store results generated from fraud detection module 160.

Database 126 includes any one or a combination of volatile or non-volatile local or remote devices suitable for storing information. For example, database 126 may include Random Access Memory ("RAM"), Read-only Memory ("ROM"), magnetic storage devices, optical storage devices, or any other suitable information storage device or a combination of these devices. While database 126 is shown in administrative module 120 in the illustrated embodiment of FIG. 1, database 126 may be located in any location suitable for communication with administrative module 120, position conversion module 140, and/or fraud detection module 160. For example, database 126 may be externally located from administrative module 120, position conversion module 140, and/or fraud detection module 160. As another example, database 126a of databases 126a-n may be located in administrative module 120, database 126b may be located in position conversion module 140, database 126c may be located in fraud detection module 160, and so on. Although described as a database, databases 126 may be implemented as any suitable type of volatile or non-volatile memory. Database 126 may include one or more interfaces and/or processors.

Processor 134 of administrative module 120 controls certain operations of administrative module 120 by processing information received from interface 122 and memory 124 or otherwise accessed by processor 134. Processor 134 communicatively couples to interface 122 and memory 124. Processor 126 includes any hardware and/or software that operates to control and process information. Processor 134 may be a programmable logic device, a microcontroller, a microprocessor, any suitable processing device, or any suitable combination of the preceding. Additionally, processor 134 may be a component external to administrative module 120. Processor 134 may be located in any location suitable for processor 134 to communicate with administrative module 120. Processor 134 controls the operation of invoice analyzer 132.

Invoice analyzer 132 accesses information in database 126, processes and analyzes the accessed information, and arranges this information for input into position conversion module 140. For example, invoice analyzer may search database 126 for particular invoice 128a of invoices 128a-n, determine which information (e.g., positions 130a-n) to collect for input into position conversion module 140, and arrange this collected information into a format so that interface 122 can transmit this collected information to position conversion module 140. As another example, invoice analyzer may search database 126 for information (e.g., fraud results for invoice 128a) received from fraud detection module 160, determine which information (e.g., fraud results for a certain invoice 128a) to collect in response to a request from a user (e.g., an insurance agent) of a workstation, and arrange this collected information into an intelligent view so that interface 122 can display this collected information to the user.

In the illustrated embodiment, position conversion module 140 is a computer program that receives information (e.g., positions 130a-n of invoice 128a) from administrative module 120 and converts this information to a vector (e.g., a vector representative of entire invoice 128a). In the illustrated embodiment, position conversion module 140 includes an interface 142, a memory 144, and a processor 154. Memory 144 of position conversion module 140 includes position converter 146. The elements of position conversion module 140 may be implemented using any suitable combination of hardware, firmware, and software.

Position conversion module 140 may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more servers, a server pool, switch, router, one or more processors within these or other devices, or any other suitable processing device. Position conversion module 140 may be a standalone computer or may be a part of a larger network of computers associated with an entity.

Interface 142 of position conversion module 140 represents any suitable computer element that can receive information from network 110, transmit information through network 110, perform suitable processing of the information, communicate to other components (e.g., fraud detection module 160) of system 100, or any combination of the preceding. For example, interface 142 may receive a communication from administrative module 120 and/or transmit information pertaining to the received communication to fraud detection module 160. Interface 142 represents any port or connection, real or virtual, including any suitable combination of hardware, firmware, and software, including protocol conversion and data processing capabilities, to communicate through a Local Area Network ("LAN"), Wide Area Network ("WAN"), or other communication system that allows the entity associated with system 100 to exchange information between components of system 100.

Memory 144 of position conversion module 140 stores, permanently and/or temporarily, received and transmitted information, as well as system software, control software, other software for position conversion module 140, and a variety of other information. Memory 144 may store information for execution by processor 154. In the illustrated embodiment, memory 144 stores position converter 146 of position conversion module 140.

Memory 144 includes any one or a combination of volatile or non-volatile local or remote devices suitable for storing information. For example, memory 144 may include Random Access Memory ("RAM"), Read-only Memory ("ROM"), magnetic storage devices, optical storage devices, or any other suitable information storage device or a combination of these devices. Memory 144 may include any suitable information for use in the operation of position conversion module 140. Additionally, memory 144 may be a component external to (or may be partially external to) position conversion module 140. Memory 144 may be located at any location suitable for memory 124 to communicate with position conversion module 140.

Processor 154 of position conversion module 140 controls certain operations of position conversion module 140 by processing information received from interface 142 and memory 144 or otherwise accessed by processor 154. Processor 154 communicatively couples to interface 142 and memory 144. Processor 154 includes any hardware and/or software that operates to control and process information. Processor 154 may be a programmable logic device, a microcontroller, a microprocessor, any suitable processing device, or any suitable combination of the preceding. Additionally, processor 154 may be a component external to position conversion module 140. Processor 154 may be located in any location suitable for processor 154 to communicate with position conversion module 140. Processor 154 controls the operation of position converter 146.

Position converter 146 of position conversion module 140 accesses information received from administrative module 120, processes and analyzes the accessed information, and arranges this information for input into fraud detection module 160. For example, position converter 146 may receive positions 130a-n of invoice 128a from administrative module 120, convert (see notation 150) positions 130a-n to a combined position vectors 148-n, and arrange this information into a format (e.g., invoice vector 167a) so that interface 142 can transmit this information to fraud detection module 160. As another example, position converter 146 may receive positions 130a-n of each invoice 128a-n from administrative module 120, convert positions 130a-n for each invoice 128a-n to combined position vectors 148a-n, respectively, and arrange this information into a format (e.g., n-dimensional hyperspace representation of invoice vectors 167a-n) so that interface 142 can transmit this information to fraud detection module 160. In certain embodiments, position converter 146 is a neural network (e.g., a deep neural network). Position converter 146 is described in more detail in FIG. 2 below.

Fraud detection module 160 is a computer program for detecting fraud in data (e.g., invoices 128a-n). In the illustrated embodiment, fraud detection module 160 includes an interface 162, a memory 164, and a processor 174. Memory 164 of fraud detection module 160 includes fraud detector 166. The elements of fraud detection module 160 may be implemented using any suitable combination of hardware, firmware, and software.

Fraud detection module 160 may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more servers, a server pool, switch, router, one or more processors within these or other devices, or any other suitable processing device. Fraud detection module 160 be a stand-alone computer or may be a part of a larger network of computers associated with an entity.

Interface 162 of fraud detection module 160 represents any suitable computer element that can receive information from network 110, transmit information through network 110, perform suitable processing of the information, communicate to other components (e.g., administrative module 120) of system 100, or any combination of the preceding. For example, interface 162 may receive a communication from position conversion module 140 and/or transmit information pertaining to the received communication to administrative module 120. Interface 162 represents any port or connection, real or virtual, including any suitable combination of hardware, firmware, and software, including protocol conversion and data processing capabilities, to communicate through a Local Area Network ("LAN"), Wide Area Network ("WAN"), or other communication system that allows the entity associated with system 100 to exchange information between components of system 100.

Memory 164 of fraud detection module 160 stores, permanently and/or temporarily, received and transmitted information, as well as system software, control software, other software for fraud detection module 160, and a variety of other information. Memory 164 may store information for execution by processor 174. In the illustrated embodiment, memory 164 stores fraud detector 166 of fraud detection module 160.

Memory 164 includes any one or a combination of volatile or non-volatile local or remote devices suitable for storing information. For example, memory 144 may include Random Access Memory ("RAM"), Read-only Memory ("ROM"), magnetic storage devices, optical storage devices, or any other suitable information storage device or a combination of these devices. Memory 164 may include any suitable information for use in the operation of fraud detection module 160. Additionally, memory 164 may be a component external to (or may be partially external to) fraud detection module 160. Memory 164 may be located at any location suitable for memory 164 to communicate with fraud detection module 160.

Processor 174 of fraud detection module 160 controls certain operations of fraud detection module 160 by processing information received from interface 162 and memory 164 or otherwise accessed by processor 164. Processor 174 communicatively couples to interface 162 and memory 164. Processor 174 includes any hardware and/or software that operates to control and process information. Processor 174 may be a programmable logic device, a microcontroller, a microprocessor, any suitable processing device, or any suitable combination of the preceding. Additionally, processor 174 may be a component external to fraud detection module 160. Processor 174 may be located in any location suitable for processor 174 to communicate with fraud detection module 160. Processor 174 controls the operation of fraud detector 166.

Fraud detector 166 of fraud detection module 160 analyzes information for fraud. In the illustrated embodiment, fraud detector 166 accesses information received from position conversion module 140, processes and analyzes the accessed information, and arranges this information for input into administrative module 120. For example, fraud detector 166 may receive combined position vectors 148a-n from position conversion module 140, generate invoice vector 167a from combined position vectors 148a-n, compare (see notation 171) invoice vector 167a to a fraud detection parameter 168a, and arrange (see notation 172) the comparison results into a format (e.g., list 170) so that interface 162 can transmit these results to administrative module 120. As another example, fraud detector 166 may receive invoice vectors 167a-n from position conversion module 140, compare invoice vectors 167a-n to fraud detection parameters 168a-n (where n represents any suitable integer), and arrange these comparison results into a format (e.g., list 170) so that interface 162 can transmit these results to administrative module 120.

Fraud detection parameters 168a-n of fraud detector 166 represent constraints for detecting fraud in combined position vectors 148a-n. For example, when invoice vector 167a is located within fraud detection parameter 168a, fraud is not detected in invoice 128a associated with invoice vector 167a, as indicated in list 170 by the word "NO". As another example, when invoice vector 167b is located within fraud detection parameter 168b, fraud is not detected in invoice 128b associated with invoice vector 167b, as indicated in list 170 by the word "NO". As still another example, when invoice vector 167n is not located within fraud detection parameter 168n, fraud is detected in invoice 128n associated with invoice vector 167n, as indicated in list 170 by the word "YES". While system 100 illustrates a list to indicate fraud results, any suitable format (e.g., a graph) may be utilized to indicate fraud in system 100. Further, while list 170 indicates fraud in invoices using the terms "YES" and "NO", list 170 may utilize any notation suitable to indicate fraud (e.g., a check or an "x").

In certain embodiments, measurements are used to determine whether invoices 128a-n are indicative of fraud. For example, fraud detector 166 may measure a similarity between combined position vector 148a and one or more sample vectors determined to be free from fraud using cosine similarity. A high cosine similarity may represent similarities between combined position vector 148a and the one or more sample vectors, which may indicate that invoice 148a is fraudless. A low cosine similarity (e.g., a value close to 0) may represent differences between combined position vector 148a and the one or more sample vectors, which may indicate that invoice 148a is fraudulent. As another example, fraud detector 166 may measure a similarity between combined position vector 148a and one or more sample vectors determined to be free from fraud using Euclidean distance similarity.

In response to fraud detection module 160 analyzing invoices 128a-n for fraud, fraud detection module 160 may take action based on the analysis. For example, fraud detection module 160 may accept the invoice, deny the invoice, execute further analysis (e.g., a further comparison), and/or trigger a business process (e.g., report fraud to one or more organizations).

Figure 2:
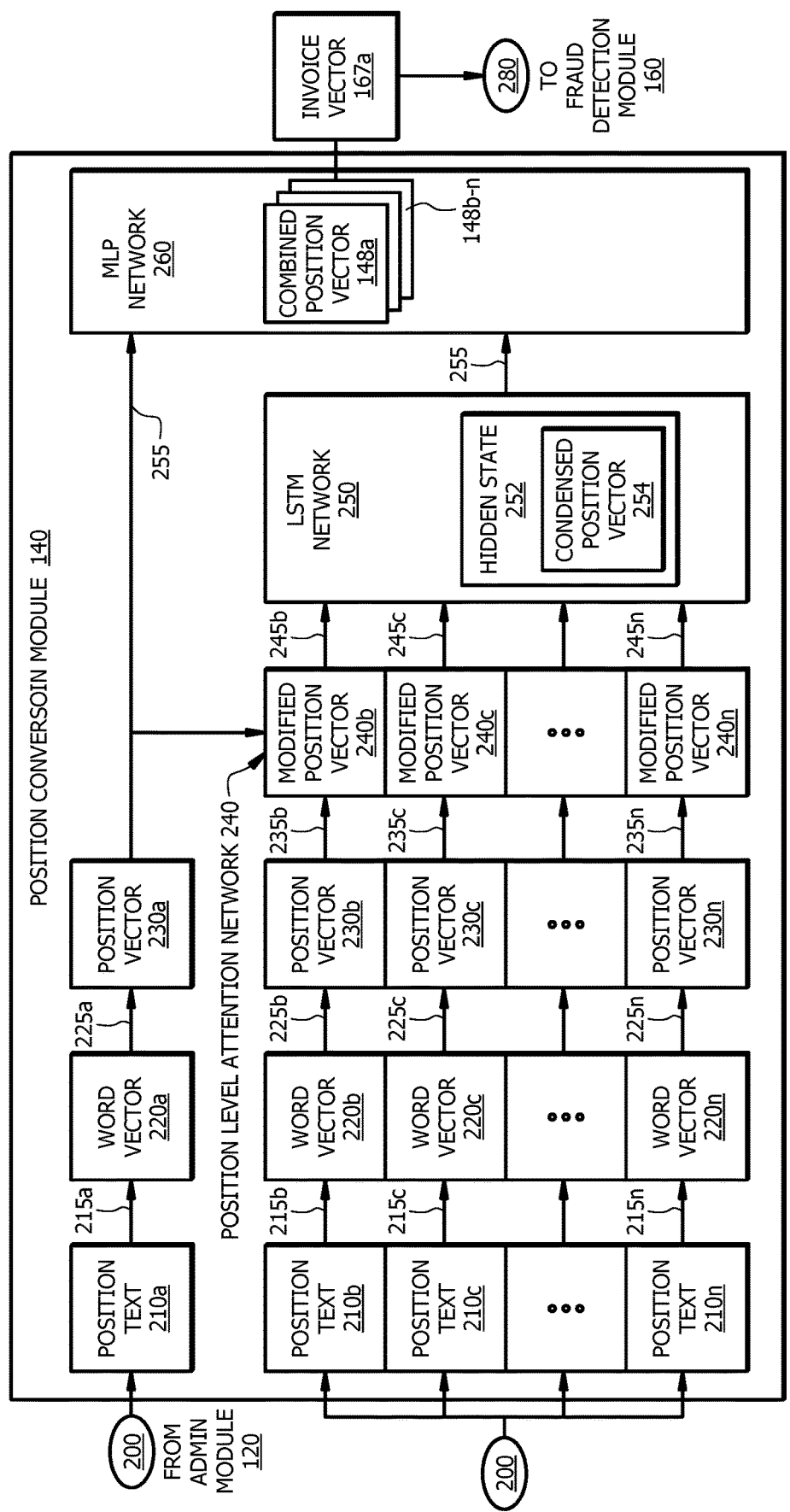
FIG. 2 illustrates additional example details of the position conversion module of FIG. 1, according to certain embodiments.

FIG. 2 illustrates additional example details of position conversion module 140 of FIG. 1, according to certain embodiments. As shown, position conversion module 140 receives (see notation 120) position texts 210a-n of invoice 128a from administrative module 120 and converts position texts 210a-n to combined vectors 148a-n, generates invoice vector 167a from combined vectors 148a-n, and transmits (see notation 280) invoice vector 167a to fraud detection module 160.

Position conversion module 140 receives (see notation 200) position text 210a of position 130a of invoice 128a from administrative module 120. In response to receiving position text 210a from position 130a of invoice 128a, position converter 146 of position conversion module 140 converts (see notation 215a) position text 210a to a word vector 220a. The conversion is described in more detail in FIG. 3 below.

Position converter 146 of position conversion module 140 may concatenate (see notation 225a) word vector 220a with a number vector to generate a position vector 230a. The concatenation is described in more detail in FIG. 3 below. In certain embodiments, word vector 220a, the number vector, and position vector 230a have a predetermined dimensionality. For example, word vector 220a may have a predetermined dimensionality of 1500, the number vector may have a predetermined dimensionality of 75, and position vector 230a may have a dimensionality of 1500+75. Position vector 230a is a vector representation of position text 210a from position 130a of invoice 128a.

In the illustrated embodiment of FIG. 2, the above described process of converting position text 210a of invoice 128a to position vector 230a is repeated for neighboring position texts 210b-n (where n represents any suitable integer). For example, position conversion module 140 may receive (see notation 200) position text 210b of invoice from position 130b of invoice 128a from administrative module 120, convert (see notation 215b) position text 210b to word vector 220b, and concatenate (see notation 225b) word vector 220b with a number vector to generate a position vector 230b, and so on. In certain embodiments, position texts 210a-n represent all position texts included in invoice 128a.

Position conversion module 140 may include one or more networks. For example, position conversion module 140 may include a position level attention network 240, a long short-term memory ("LSTM") network 250, and a multilayer perceptron ("MLP") network 260.

Position level attention network 240 of position conversion module 140 is any network that can receive position vectors 230b-n, which neighbor position vector 230a, from one or more components of system 100. In certain embodiments, position level attention network 240 is a feedforward MLP network. Position level attention network 240 may receive as input position vectors 230b-n from a database of memory 144 of position conversion module 140, generate a scalar value associated with the position vectors 230b-n, and multiply each position vector 230b-n to the generated scalar value to generate modified position vectors 240b-n. Position level attention network may then transfer (see notation 245) the modified position vectors 240b-n to LSTM network 250.

LSTM network 250 of position conversion module 140 is any network that can receive neighboring position vectors 240b-n from one or more components of system 100. For example, LSTM network 250 may receive (see notation 245b) as input modified position vectors 240b-n from a database of memory 144 of position conversion module 140 and condense information associated with modified position vectors 240b-n into a condensed position vector 254. LSTM network 250 includes a hidden state 252, which outputs condensed position vector 254.

MLP network 260 is any network that can receive position vectors from one or more components of system 100. For example, MLP network 260 may receive (see notation 255) as input position vector 230a and condensed position vector 254 from memory 144 (e.g., a database) of position conversion module 140. In certain embodiments, MLP network 260 concatenates position vector 230a and condensed position vector 254 to generate a combined position vector 148a. For example, MLP network 260 may combine information from position text 210a with information (e.g., contextual information) from position texts 210a-n to generate combined position vector 148a.

In certain embodiments, combined position vector 148a provides a complete description of the service or product of position text 210a. For example, position text 210a may read "technician". Based on information derived from position texts 210b-n (e.g., "roofing materials"), MLP network may generate a description that represents text "roof technician". In some embodiments, MLP network 260 may use information derived from one or more sources other than position text 210a-n. For example, position 130a of invoice 128a may include a units category indicating units (e.g., hours) for particular services, and MLP network 260 may generate a more complete description for position text 210a that reads "hourly roof technician".

In some embodiments, system 100 may train position conversion module 140 to generate a complete description for position text 210a by utilizing machine learning. For example, several sample invoice positions (e.g., over 2,000 invoice positions) may be input into position conversion module 140 alongside combined position vector 148a representing complete position text. System 100 may utilize the backpropagation method to learn neural network parameters of position conversion module 140 and map incomplete position text (e.g., "technician") to a complete position text (e.g., "HVAC technician"). The mapping of incomplete position text to complete position text that is used to train the neural network of position conversion module 140 may be performed by subject experts who identify and map together different linguistic forms and ways to express the same semantic meaning in the natural language.

The above process of converting position texts 210a-n to combined position vector 148a is repeated for position texts 210b-n to generate combined position vectors 148b-n, respectively. For example, position level attention network 240 may receive position vectors 230a and 230c-n, which neighbor position vector 230b, generate a scalar value associated with the position vectors 230a and 230c-n, and multiply each position vector 230a and 230c-n to the generated scalar value to generate modified position vectors 240a and 240c-n. Position level attention network 240 may then transfer the modified position vectors 240a and 240c-n to LSTM network 250, which then condenses information associated with modified position vectors 240a and 240c-n into a condensed position vector 254 (representative of 240a and 240c-n). MLP network 260 then concatenates position vector 230b and condensed position vector 254 to generate a combined position vector 148b.

Combined position vectors 148a-n are numeric representations of position texts 210a-n, respectively. In addition to neighboring position text, the generation of combined position vectors 148a-n by position conversion module 140 (e.g., a deep neural network) may take into account position texts, units, amounts, and/or prices associated with positions 130a-n.

In certain embodiments, combined position vectors 148a-n are summed to generate an invoice vector 167a. Invoice vector 167a is a numeric representation of the entire invoice (e.g., invoice 128a). In some embodiments, MLP network 260 transfers combined position vectors 148a-n to a processor (e.g., processor 154 of FIG. 1) of position conversion module 140, which generates invoice vector 167a and then transfers (see notation 280) invoice vector 167a to fraud detection module 160 of FIG. 1. In certain embodiments, the processor that generates invoice vector 167a may be external to position conversion module 140.

This process of generating invoice vector 167a may be repeated for invoices 128b-n to generate invoice vectors 167b-n, respectively.

Figure 3:
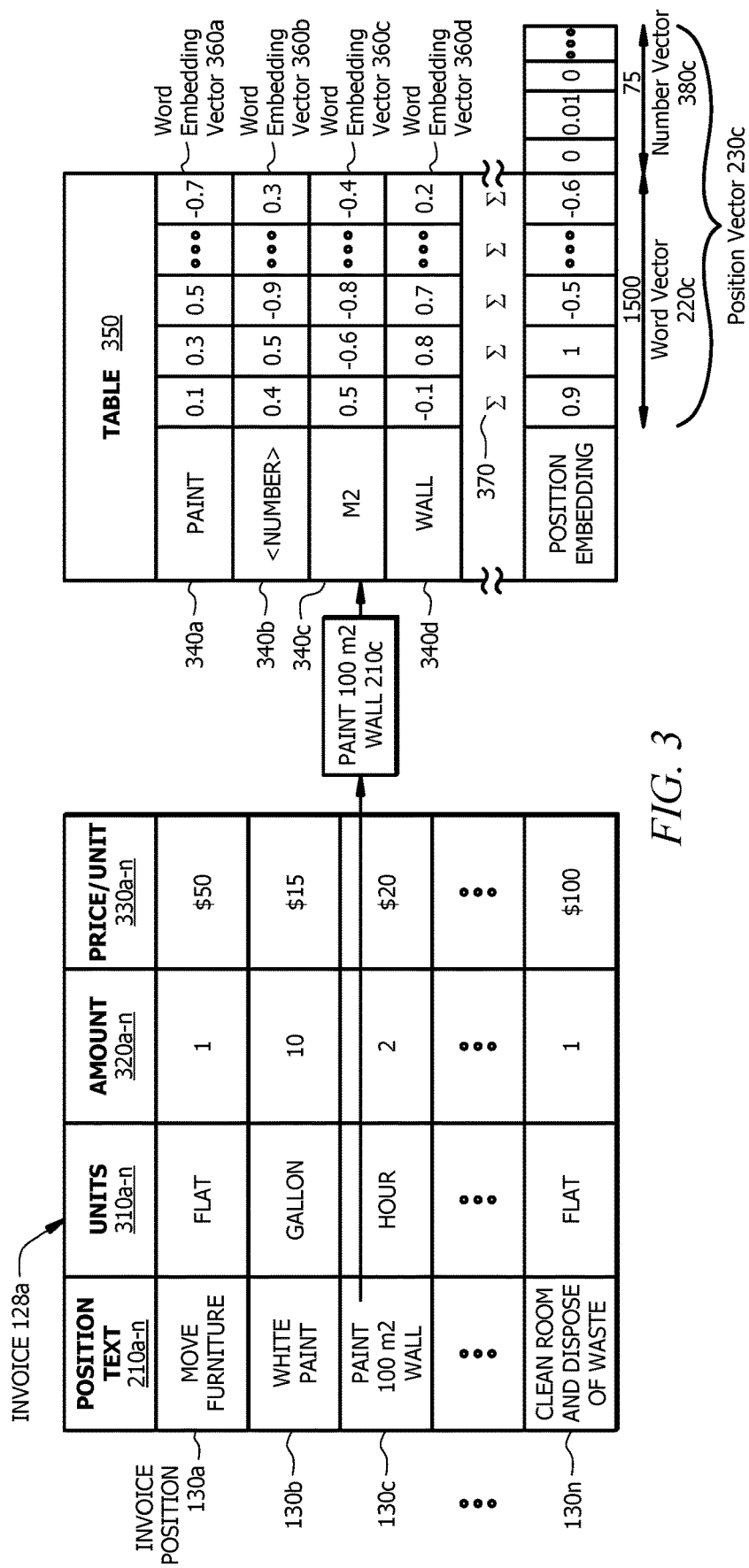
FIG. 3 illustrates additional example details of the position conversion module of FIG. 2, according to certain embodiments.

FIG. 3 illustrates additional example details of position conversion module 140 of FIG. 2, according to certain embodiments. In particular, FIG. 3 illustrates an example conversion of position text 210c, as shown in FIG. 2, to position vector 230c, as shown in FIG. 2. In certain embodiments, an invoice (e.g., invoice 128a of administrative module 120) includes position texts 210a-n, units 310a-n, amounts 320a-n, and price per unit 330a-n, where n represents any suitable integer. Position texts 210a-n can be any combination of words, numbers, and symbols representative of a service or product. For example, position text 210a of invoice position 130a reads "move furniture," position text 210b of invoice position 130b reads "white paint," position text 130c of invoice position 130c reads "paint 100 m2 wall," and position text 210n of invoice position 130n reads "clean room and dispose waste." In certain embodiments, position texts 210a-n include an incomplete description of the associated service and or product. For example, position text 210d may read "technician," which could be interpreted as a roofing technician or an HVAC technician.

Units 310a-n represent any standard for which amounts can be measured. For example, "flat" unit 310a of invoice position 130a represents a flat rate to move furniture, "gallon" unit 310b of invoice position 130b represents a gallon of white paint, "hour" unit 130c of invoice position 130c represents an hour of painting 100 m2 wall, and "flat" unit 310n of invoice position 130n represents a flat rate to clean room and dispose waste. Units may be based on any measurement system (e.g., Metric or U.S. standard system).

Amounts 320a-n represent quantities of units. For example, amount 320a of invoice position 130a represents a single flat rate to move furniture, amount 320b of invoice position 130b represents 10 gallons of white paint, amount 320c of invoice position 130c represents 2 hours to paint 100 m2 wall, and amount 320n of invoice position 130n represents a single flat rate to clean room and dispose waste. Amount 320a-n may be represented by numbers (e.g., 10) or words (e.g., ten).

Prices per unit 330a-n represent costs associated with a single unit 310a-n. For example, price per unit 330a of invoice position 130a represents a $50 flat rate to move furniture, price per unit 330b of invoice position 130b represents a $15 cost for each gallon of white paint, price per unit 330c of invoice position 130c represents a $20 cost for each hour to paint 100 m2 wall, and price per unit 330n of invoice position 130n represents a $100 flat rate to clean room and dispose waste.

In certain embodiments, position conversion module 140 converts position texts 210a-n to position vectors 230a-n, respectively. For example, as shown in FIG. 2, position conversion module 140 may convert position text 210c to position vector 230c. In the illustrated embodiment, each word and/or number 340a, 340b, 340c, and 340d of position text 210c (i.e., "paint", "100", "m2", and "wall", respectively) is represented in table 350. In instances where position text includes more than a certain number of words (e.g., 75 words), the words may be truncated so that table 350 includes a maximum number of words (e.g., 75 words). Each number in position text 210c may be replaced by a special token, in some embodiments. For example, number "100" in position text 210c is replaced by <number> (see notation 340b) in table 350. Each word and number 340a-d of position text 210c is then converted to word embedding vectors 360a-d, respectively.

Position conversion module 140 may utilize one or more of the following known word embedding techniques to convert each word and number 340a-d of position text 210c to word embedding vectors 360a-d: Global Vectors for Word Representation ("GloVe"), word2vec, and fastText. For example, during a training phase, one of the word embedding techniques (e.g., GloVe) may generate a look-up table that maps individual words in vocabulary to vectors. This look-up-table is used to generate word embedding vectors 360a-d for each word 340a-d in position text 210c.

Each word embedding vector 360a-d of table 350 may have a predetermined dimensionality with a predetermined number of units. For example, word embedding vector 360a for the word "paint" may have a predetermined dimensionality of 1500, which is represented by 1500 units that include units 0.1, 0.3, 0.5. and so on, with a last unit of −0.7. As another example, word embedding vector 360b for special token <number> may have a predetermined dimensionality of 1500, which is represented by 1500 units that include units 0.4, 0.5, −0.9. and so on, with a last unit of 0.3.

In the illustrated embodiment, word embedding vectors 360a-360d are summed (see notation 370) to generate word vector 220c. In some embodiments, word embedding vectors 360a-d and word vector 220c all have the same dimensionality (e.g., 1500). Word vector 220c is then concatenated with a number vector 380c to generate position vector 230c. Number vector 380c may include one or more numbers from the position text 210c multiplied by a predefined normalization factor (e.g., $1/10,000$). In the illustrated embodiment, number vector 380c may include number 0.01, which represents the number "100" from position text 210c divided by predetermined number 10,000. This predefined normalization factor may be selected to keep the median value of normalized numbers occurring in position texts of statistically large number of invoices (e.g., greater than 100,000) at approximately 0.5. Number 0.01 is located in a position (second unit from left) corresponding to a position of the number in position text 210c (second word or number from left). In other embodiments, the number from position text 210c may be divided by any other predetermined number and may be located in a position other than a position corresponding to the position of the number in position text 210c. All other units of number vector 380c not corresponding to a number in position text 210 may be set to a predetermined number (e.g., 0).

Number vector 380c may have a dimensionality that is less than the dimensionality of word vector 220c. For example, word vector 220c may have a dimensionality of 1500 and number vector 380c may have a dimensionality of 75. Position converter 146 of system 100 may then concatenate word vector 220c and number vector 380c to generate position vector 230c. In some embodiments, position vector 230c may have a dimensionality of 1500+75. Position vector 230c may then be used to generate modified position vector 240c and ultimately invoice vector 167a, as described above in reference to FIG. 2.

Figure 4:
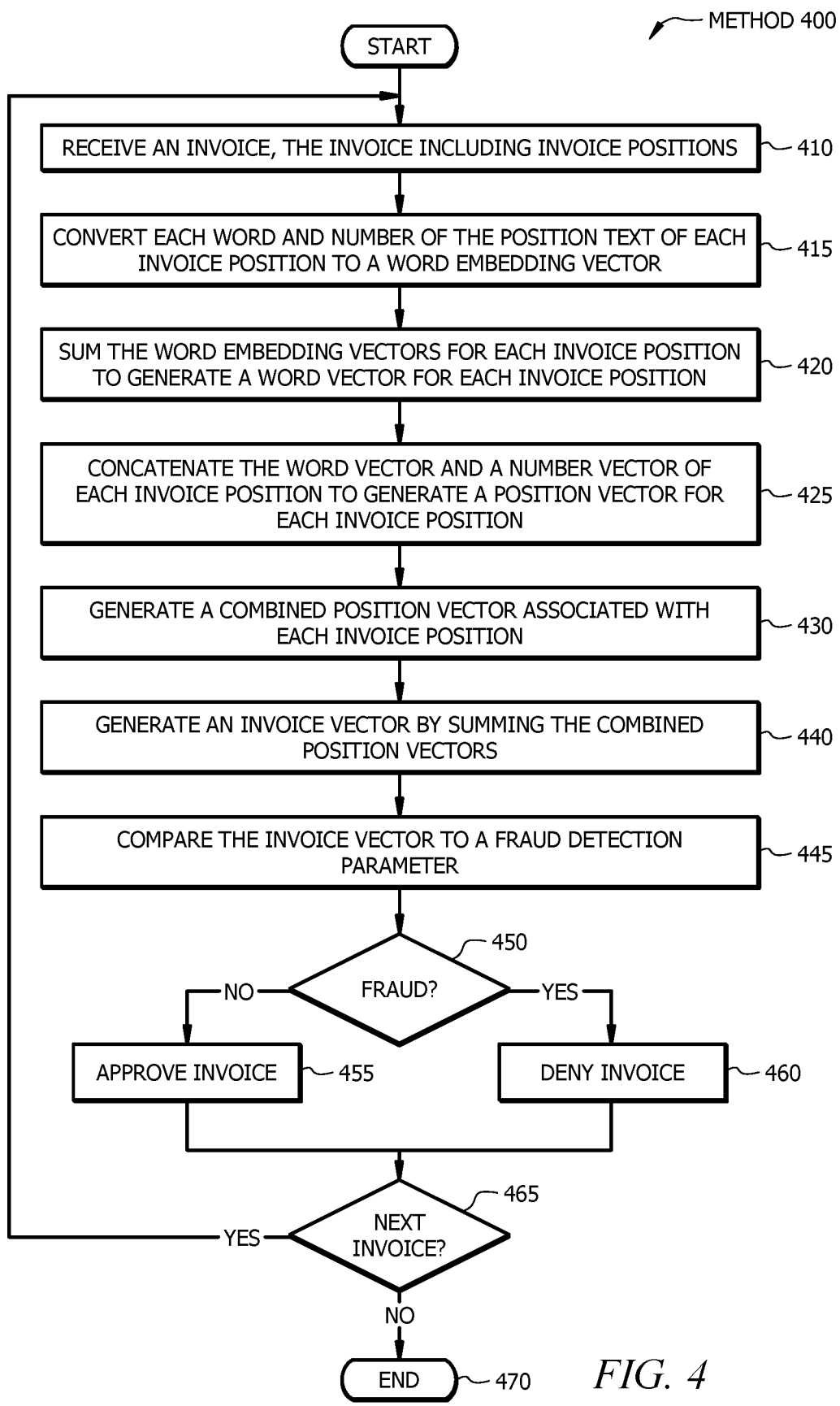
FIG. 4 illustrates an example method for detecting fraud in invoices, according to certain embodiments.

FIG. 4 illustrates an example method 400 for detecting fraud in invoices, according to certain embodiments. In some embodiments, method 400 begins at step 410, where a computer system (e.g., position conversion module 140) receives an invoice (e.g., invoice 128a). The invoice includes one or more invoice positions (e.g. invoice positions 130a-n). Each invoice position includes invoice information. For example, an invoice position may include position text, units, amount, and a price per unit. In certain embodiments, the computer system receives particular invoice information from an administrative module (e.g., administrative module 120). For example, position conversion module 140 may receive position text 210a from administrative module 210.

Method 400 then proceeds to step 415, where the computer system converts each word and number of the position text of each invoice position to a word embedding vector (e.g., word embedding vectors 360a-d). In certain embodiments, converting each word and number of the position text of each invoice position to a word embedding vector includes truncating the words and the numbers of each position text to a predetermined number of words and numbers (e.g., 75 words and numbers). Converting each word and number of the position text of each invoice position to a word embedding vector may also include replacing the numbers with unique tokens. One of the following techniques may be utilized to convert each word and/or number of the position text to a word embedding vector: Global Vectors for Word Representation ("GloVe"); word2vec; and fastText.

Method 400 then advances to step 420, where the word embedding vectors for each invoice position are summed to generate a word vector for each invoice position. The word vector and a number vector of each invoice position are concatenated at step 425 to generate a position vector for each invoice position (e.g., position vector 230a). Method 400 then moves to step 430, where a combined position vector associated with each invoice position is generated using one or more neighboring position vectors. An invoice vector (e.g., invoice vector 167a) is then generated by the computer system at step 440 by summing the combined position vectors (e.g., combined position vectors 148a-n). At step 445, the invoice vector is compared to a fraud detection parameter (e.g., fraud detection parameter 168a). In certain embodiments, fraud detection parameters 168a-n may be determined from historical data. For example, fraud detection parameters may be learned from invoices determined to be fraudulent and fraudless based on human expert knowledge. In some embodiments, learning may be realized using any suitable classification machine learning algorithm (e.g., linear classifier, support vector machine, or random forest).

At step 450, the computer system determines whether the invoice is indicative of fraud based on the comparison. If the invoice is indicative of fraud, method 400 advances to step 455, and the invoice is approved. If the invoice is indicative of fraud, method 400 moves to step 460, and the invoice is denied. Method 400 then moves to step 465, where the computer system determines whether another invoice (e.g., invoice 128b) has been received. If another invoice has been received, method 400 moves to step 410, where the above described process is repeated. If another invoice has not been received, method 400 moves to step 470, where method 400 ends.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for detecting fraud in invoices including the particular steps of the method of FIG. 4, this disclosure contemplates any suitable method for detecting fraud in invoices including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
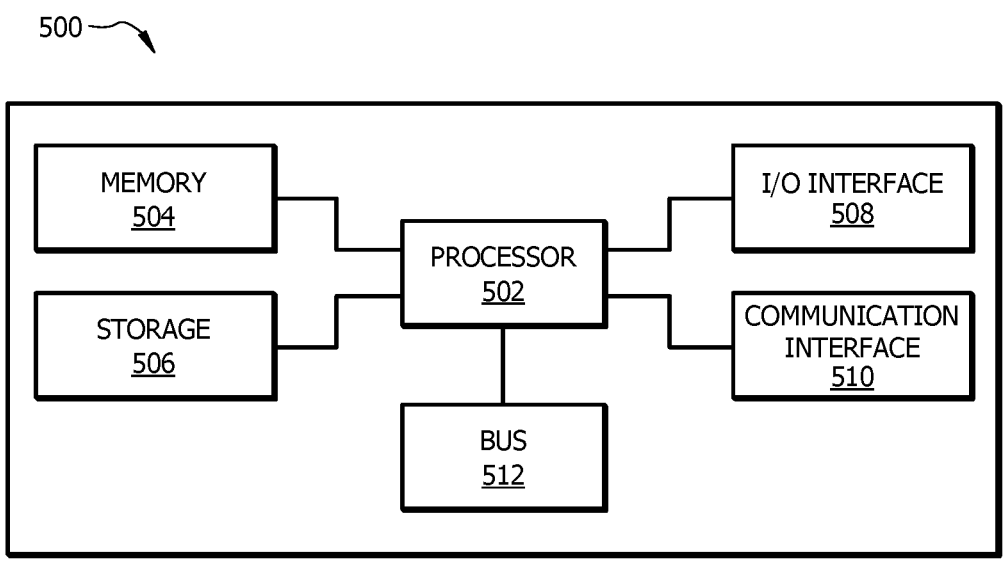
FIG. 5 illustrates an example computer system for detecting fraud in invoices, according to certain embodiments.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A network security system for fraud detection comprising:
   one or more processors; and
   a memory communicatively coupled to the one or more processors, the memory comprising instructions executable by the one or more processors, the one or more processors being operable when executing the instructions to:
      receive an invoice comprising a plurality of invoice positions, each of the invoice positions comprising a position text;
      convert each word and number of the position text of each invoice position to a word embedding vector;
      sum the word embedding vectors for each invoice position to generate a word vector for each invoice position;
      concatenate the word vector and a number vector of each invoice position to generate a position vector for each invoice position;
      generate a first combined position vector for a first invoice position by:
         modifying the position vectors that neighbor a first position vector;
         condensing the neighboring position vectors of the first position vector to generate a first condensed position vector; and
         concatenating the first condensed position vector and the first position vector to generate the first combined position vector;
      generate a second combined position vector for a second invoice position by:
         modifying the position vectors that neighbor a second position vector;
         condensing the neighboring position vectors of the second position vector to generate a second condensed position vector; and
         concatenating the second condensed position vector and the second position vector to generate the second combined position vector;
      generate an invoice vector by summing the first combined position vector and the second combined position vector, wherein the invoice vector is a numeric representation of the invoice;
      compare the invoice vector to a fraud detection parameter; and
      determine whether the invoice is indicative of fraud based on the comparison.

2. The system of claim 1, wherein the one or more processors are further operable when executing the instructions to:
   generate a third combined position vector for a third invoice position by:
      modifying the position vectors that neighbor a third position vector;
      condensing the neighboring position vectors of the third position vector to generate a third condensed position vector; and
      concatenating the third condensed position vector and the third position vector to generate the third combined position vector; and
   generate the invoice vector by summing the third combined position vector and the first and second combined position vectors.

3. The system of claim 1, wherein:
   the fraud detection parameter is one or more sample invoice vectors determined to be absent of fraud; and
   comparing the invoice vector to the fraud detection parameter comprises measuring a similarity between the invoice vector and the one or more sample invoice vectors using one or more of the following:
      cosine similarity; and
      Euclidean distance similarity.

4. The system of claim 1, wherein the one or more processors are further operable when executing the instructions to take an action based on the comparison of the invoice vector to the fraud detection parameter, the action comprising one or more of the following:
   accepting the invoice;
   denying the invoice;
   executing further comparisons; and
   triggering a business process.

5. The system of claim 1, wherein converting each word and number of the position text of each invoice position to a word embedding vector comprises:
   truncating the words and the numbers of each position text to a predetermined number of words and numbers;
   replacing the numbers with unique tokens; and
   utilizing one or more of the following techniques:
      Global Vectors for Word Representation ("GloVe");
      word2vec; and
      fastText.

6. The system of claim 1, wherein:
   the number vector comprises a number from the position text divided by a first predetermined number;
   the number of the number vector is located in a position of the second vector corresponding to a position of the number in the position text; and
   all other positions of the second vector not corresponding to the number are set to a second predetermined number.

7. The system of claim 1, wherein each word vector has a first predetermined number of positions, each number vector has a second predetermined number of positions that is less than the first predetermined number of positions, and each position vector has a third predetermined number of positions equal to the sum of the first and second predetermined number of positions.

8. The system of claim 1, wherein generating the first combined position vector further comprises replacing an incomplete word embedding vector associated with the first position vector with a complete word embedding vector by deriving context from the position text of the neighboring position vectors of the first position vector.

9. A method, comprising:
   receiving an invoice comprising a plurality of invoice positions, each of the invoice positions comprising a position text;

converting each word and number of the position text of each invoice position to a word embedding vector;

summing the word embedding vectors for each invoice position to generate a word vector for each invoice position;

concatenating the word vector and a number vector of each invoice position to generate a position vector for each invoice position;

generating a first combined position vector for a first invoice position;

generating a second combined position vector for a second invoice position;

generating an invoice vector by summing the first combined position vector and the second combined position vector, wherein the invoice vector is a numeric representation of the invoice;

comparing the invoice vector to a fraud detection parameter; and determining whether the invoice is indicative of fraud based on the comparison.

10. The method of claim 9, further comprising:

generating a third combined position vector for a third invoice position; and generating the invoice vector by summing the third combined position vector and the first and second combined position vectors.

11. The method of claim 9, wherein:

the fraud detection parameter is one or more sample invoice vectors determined to be absent of fraud; and comparing the invoice vector to the fraud detection parameter comprises measuring a similarity between the invoice vector and the one or more sample invoice vectors using one or more of the following:

cosine similarity; and

Euclidean distance similarity.

12. The method of claim 9, further comprising taking an action based on the comparison of the invoice vector to the fraud detection parameter, the action comprising one or more of the following:

accepting the invoice;

denying the invoice;

executing further comparisons; and triggering a business process.

13. The method of claim 9, wherein converting each word and number of the position text of each invoice position to a word embedding vector comprises:

truncating the words and the numbers of each position text to a predetermined number of words and numbers;

replacing the numbers with unique tokens; and utilizing one or more of the following techniques:

Global Vectors for Word Representation ("GloVe");

word2vec; and fastText.

14. The method of claim 9, wherein:

the number vector comprises a number from the position text divided by a first predetermined number;

the number of the number vector is located in a position of the second vector corresponding to a position of the number in the position text; and all other positions of the second vector not corresponding to the number are set to a second predetermined number.

15. The method of claim 9, wherein each word vector has a first predetermined number of positions, each number vector has a second predetermined number of positions that is less than the first predetermined number of positions, and each position vector has a third predetermined number of positions equal to the sum of the first and second predetermined number of positions.

16. The method of claim 9, wherein generating the first combined position vector further comprises replacing an incomplete word embedding vector associated with the first position vector with a complete word embedding vector by deriving context from the position text of the neighboring position vectors of the first position vector.

17. One or more computer-readable non-transitory storage media embodying one or more units of software that is operable when executed to:

receive an invoice comprising a plurality of invoice positions, each of the invoice positions comprising a position text;

convert each word and number of the position text of each invoice position to a word embedding vector;

sum the word embedding vectors for each invoice position to generate a word vector for each invoice position;

concatenate the word vector and a number vector of each invoice position to generate a position vector for each invoice position;

generate a first combined position vector for a first invoice position;

generate a second combined position vector for a second invoice position;

generate an invoice vector by summing the first combined position vector and the second combined position vector, wherein the invoice vector is a numeric representation of the invoice;

compare the invoice vector to a fraud detection parameter; and determine whether the invoice is indicative of fraud based on the comparison.

18. The media of claim 17, wherein the one or more units of software are further operable when executed to:

generate a third combined position vector for a third invoice position; and generate the invoice vector by summing the third combined position vector and the first and second combined position vectors.

19. The media of claim 17, wherein:

the fraud detection parameter is one or more sample invoice vectors determined to be absent of fraud; and comparing the invoice vector to the fraud detection parameter comprises measuring a similarity between the invoice vector and the one or more sample invoice vectors using one or more of the following:

cosine similarity; and

Euclidean distance similarity.

20. The media of claim 17, wherein the one or more units of software are further operable when executed to take an action based on the comparison of the invoice vector to the fraud detection parameter, the action comprising one or more of the following:

accepting the invoice;

denying the invoice;

executing further comparisons; and triggering a business process.

* * * * *